(12) United States Patent
Karogal (10) Patent No.: US 8,624,163 B2
(45) Date of Patent: Jan. 7, 2014

(54) MODIFIED FLUX SYSTEM

(75) Inventor: Nikhil U. Karogal, Cleveland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 3006 days.

(21) Appl. No.: 11/142,586

(22) Filed: Jun. 1, 2005

(65) Prior Publication Data

US 2007/0017956 A1  Jan. 25, 2007

(51) Int. Cl.
*B23K 35/22* (2006.01)

(52) U.S. Cl.
USPC .............. 219/146.1; 219/146.31; 219/145.22; 219/145.1

(58) Field of Classification Search
USPC .................. 219/146.1, 146.31, 145.22, 145.1
See application file for complete search history.

(56) References Cited

U.S. PATENT DOCUMENTS

| | | | |
|---|---|---|---|
| 1,888,453 A | 11/1932 | De Pape | |
| 2,720,473 A | 10/1955 | Donahey | |
| 3,501,354 A | 3/1970 | De Long | |
| 3,620,830 A | 11/1971 | Kramer | |
| 3,694,259 A | 9/1972 | Chapman et al. | |
| 3,725,054 A * | 4/1973 | Perfect | 420/580 |
| 3,783,020 A | 1/1974 | Ichihara et al. | |
| 3,848,109 A * | 11/1974 | Zvanut | 219/146.41 |
| 3,857,702 A | 12/1974 | Corbett | |
| 3,947,655 A | 3/1976 | Gonzalez et al. | |
| 4,010,309 A | 3/1977 | Peterson | |
| 4,045,593 A * | 8/1977 | Hill et al. | 427/59 |
| 4,103,067 A | 7/1978 | Jackson et al. | |
| 4,131,784 A * | 12/1978 | Kimura et al. | 219/137 WM |
| 4,208,563 A | 6/1980 | Frantzreb | |
| 4,355,054 A | 10/1982 | Nagano et al. | |
| 4,355,224 A | 10/1982 | Mesick et al. | |
| 4,561,912 A | 12/1985 | Courtenay et al. | |
| 4,662,952 A | 5/1987 | Barringer et al. | |
| 4,725,508 A | 2/1988 | Rangaswamy et al. | |
| 4,741,974 A * | 5/1988 | Longo et al. | 428/558 |
| 5,003,155 A | 3/1991 | Chai et al. | |
| 5,055,655 A | 10/1991 | Chai et al. | |
| 5,120,931 A | 6/1992 | Kotecki et al. | |
| 5,225,661 A | 7/1993 | Chai et al. | |
| 5,300,754 A | 4/1994 | Gonzalez et al. | |
| 5,308,698 A | 5/1994 | Bishel et al. | |
| 5,369,244 A | 11/1994 | Kulikowski et al. | |
| 5,438,083 A * | 8/1995 | Takimoto et al. | 523/401 |
| 5,984,161 A | 11/1999 | Koch et al. | |
| 6,339,209 B1 * | 1/2002 | Kotecki | 219/146.23 |

(Continued)

FOREIGN PATENT DOCUMENTS

| | | |
|---|---|---|
| EP | 0 067 494 A1 | 12/1982 |
| EP | 1468778 | 10/2004 |

(Continued)

OTHER PUBLICATIONS

XP 001028478.

(Continued)

*Primary Examiner* — Alexandra Elve
(74) *Attorney, Agent, or Firm* — Hahn Loeser & Parks LLP (57) ABSTRACT

A titanium based welding flux that includes titanium dioxide and a moisture resistant agent. The titanium oxide includes purified titanium dioxide that includes little or no impurities that can act as nucleation sites for carbide formation in a weld metal. The moisture resistant compound includes a colloidal metal oxide.

18 Claims, 2 Drawing Sheets

(56) References Cited

U.S. PATENT DOCUMENTS

| | | |
|---|---|---|
| 6,384,126 B1 | 5/2002 | Pirtle et al. |
| 6,521,867 B2 | 2/2003 | Bonnet et al. |
| 6,613,159 B1 | 9/2003 | Koch et al. |
| 2004/0187961 A1 | 9/2004 | Crockett |

FOREIGN PATENT DOCUMENTS

| | | | |
|---|---|---|---|
| EP | 1 537 940 | A1 | 6/2005 |
| EP | 1710 042 | A1 | 10/2006 |
| GB | 1038977 | | 8/1966 |
| GB | 1571136 | | 7/1980 |
| GB | 1581182 | | 12/1980 |
| JP | 63-101093 | | 5/1988 |
| JP | 1-233093 | | 9/1989 |

OTHER PUBLICATIONS

XP 002390155.

* cited by examiner

MODIFIED FLUX SYSTEM

The invention relates generally to the field of welding and more particularly directed to electrodes having improved weld bead formation properties, and even more particularly directed to flux systems that reduce the amount of impurities introduced into a weld bead.

BACKGROUND OF THE INVENTION

In the field of arc welding, the main types of welding processes are gas-metal arc welding with solid (GMAW) or metal-cored wires (GMAW-C), gas shielded flux-cored arc welding (FCAW-G), self shielded flux-cored arc welding (FCAW-S), shielded metal arc welding (SMAW) and submerged arc welding (SAW). Of these processes, gas metal arc welding with solid or metal-cored electrodes are increasingly being used for joining or overlaying metallic components. These types of welding processes are becoming increasingly popular because such processes provide increased productivity and versatility. Such increase in productivity and versatility results from the continuous nature of the welding electrodes in gas metal arc welding (GMAW & GMAW-C) which offers substantial productivity gains over shielded metal arc welding (SMAW). Moreover, these electrodes produce very good looking welds with very little slag, thus saving time and expense associated with cleaning welds and disposing of slag, a problem that is often encountered in the other welding processes.

In gas metal arc welding with solid or cored electrodes, a shielding gas is used to provide protection for the weld against atmospheric contamination during welding. Solid electrodes are appropriately alloyed with ingredients that, in combination with the shielding gas, provide porosity free welds with the desired physical and mechanical properties. In cored electrodes, these ingredients are on the inside, in the core (fill) of a metallic outer sheath, and provide a similar function as in the case of solid electrodes.

Solid and cored electrodes are designed to provide, under appropriate gas shielding, a solid, substantially porosity free weld with yield strength, tensile strength, ductility and impact strength to perform satisfactorily in the final applications. These electrodes are also designed to minimize the quantity of slag generated during welding. Cored electrodes are used increasingly as an alternative to solid wires because of increased productivity during welding fabrication of structural components. Cored electrodes are composite electrodes consisting of a core (fill) material surrounded by a metallic outer sheath. The core consists mainly of metal powder and fluxing ingredients to help with arc stability, weld wetting and appearance etc., such that the desired physical and mechanical properties are obtained in the weld. Cored electrodes are manufactured by mixing up the ingredients of the core material and depositing them inside a formed strip, and then closing and drawing the strip to the final diameter. Cored electrodes provide increased deposition rates and produce a wider, more consistent weld penetration profile compared to solid electrodes. Moreover, they provide improved arc action, generate less fume and spatter, and provide weld deposits with better wetting compared to solid electrodes.

In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the work piece directly below it become molten and molten filler metal is deposited from the electrode onto the work. The molten filler metal displaces flux pool and forms the weld. In shielded metal arc welding, shielding is obtained by a flux coating instead of a loose granular blanket of flux.

In the art of welding, much prior effort has been expended in developing flux compositions of the type having predetermined flux components intended to perform in predetermined manners. A large number of compositions have been developed for use as fluxes in arc welding. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances with which these impurities may combine, in preference to the metal to form slag. Other materials may be added to lower the slag melting point, to improve slag fluidity, and to serve as binders for the flux particles.

Cored electrodes are commonly used in electric arc welding of steel base metals. These electrodes generally yield high strength welds in a single pass and multiple passes at high welding speeds. These electrodes are formulated to provide a solid, substantially nonporous weld bead with tensile strength, ductility and impact strength to meet the desired end use of various applications.

One of the many challenges during the formation of a weld metal is to reduce the amount of diffusible hydrogen in the weld bead. Diffusible hydrogen is a known cause of cracking in weld beads. Many studies have shown that an increased amount of moisture content in the flux system results in an increased amount of diffusible hydrogen in the weld metal. During welding, the heat evaporates and dissociates the water, evolving hydrogen gas, which can dissolve into the metal. Hydrogen in the weld metal can result in hydrogen induced cracking and eventual detrimental failure of the weld. Hydrogen embrittlement is a phenomenon which involves loss of ductility and increased crack susceptibility in steel at room temperature due to the presence of hydrogen in the steel. Hydrogen induced cracking can occur to some extent whenever sufficient hydrogen and stress are present in a hard steel at temperatures above −100° C. and below 150° C. Sodium and potassium silicate are commonly used as arc stabilizers and sometimes used in binder systems for flux components. Potassium silicate is known for its high moisture pick-up tendencies.

Another challenge during the formation of a weld metal is to control the amount and effect of impurities in the weld metal. Many of the flux components are derived from natural sources, thus have impurities contained within such components. One common flux component is titanium dioxide ($TiO_2$). This component is commonly added to a flux system in the form of rutile. There are many different sources of rutile throughout the world. Each one of these rutile sources includes different amounts and types of impurities. In flux systems wherein rutile comprises a significant portion of the flux system, these impurities can adversely affect the resulting weld metal. For instance, many forms of rutile include small amounts of niobium and/or vanadium. These two components in small quantities can cause carbide formation in the weld metal, thereby resulting in increased brittleness of the weld metal. Carbide formation can also result in high stress to the weld metal which can lead to cracking of the welding metal and a reduction in the impact toughness of the weld metal. Carbide formation in the weld metal is especially detrimental in multi-pass welding procedures.

In view of the present state of the art flux systems, there is a need for flux system having a reduced moisture content and a reduced amount of impurities so as to form a higher quality weld bead.

SUMMARY OF THE INVENTION

The present invention pertains to welding fluxes, and more particularly, to a welding flux that resists water absorption and has a reduced amount of impurities. The flux system of the present invention can be used in all types of welding, such as submerged arc welding and shielded metal arc welding. The flux system can be coated on a welding electrode, be inserted into the core of a metal electrode, and/or formed into a granular flux. The flux system of the present invention is particularly directed to a titanium dioxide based flux system. The titanium dioxide content of the flux system is generally at least about 4 weight percent of the flux system, typically about 5-90 weight percent of the flux system, more typically about 10-60 weight percent of the flux system, and even more typically about 10-40 weight percent of the flux system; however, other weight percentages can be used. The titanium dioxide in the titanium dioxide based flux system is selected such that at least a portion of the titanium dioxide in the flux system includes purified titanium dioxide. The flux system of the present invention also includes a moisture resistant compound to reduce moisture pickup of the flux system. The use of a flux system which includes purified titanium dioxide in combination with a moisture resistant compound has been found to overcome many of the past problems associated with weld metals having an undesired amount of hydrogen in the weld metal and weld metals having an undesired impurity content.

In another and/or alternative non-limiting aspect of the present invention, the titanium dioxide in the flux system includes about 5 percent purified titanium dioxide. The use of purified titanium dioxide in the titanium dioxide based flux system results in a reduction in the amount of impurities that are conveyed to the welding metal during a welding process. Small amounts of impurities in the natural sources of titanium dioxide can result in high stress in the weld metals, especially in multi-pass welding operations. These small amounts of impurities can result in premature cracking of the weld metal and/or a reduction in the impact toughness of the weld metal. These adverse effects on the weld metal are in part caused by carbide formation in the weld metal. Various types of metals such as, but not limited to, Nb and V can form nucleation sites for such carbide formation in the weld metal. Only very small amounts of these metals are needed to function as nucleation sites. In a titanium based flux system, the amount of titanium in the flux system can be significant. As such, even though the titanium dioxide includes very small amounts of impurities, the large amount of titanium dioxide in the flux system can result in a sufficient amount of these impurities to be transferred to the weld metal during a welding process and thereby function as nucleation sites for carbide formation in the weld metal. In order to overcome this impurity problem, a portion or all of the titanium oxide included in the flux system is purified titanium dioxide. Generally the purified titanium dioxide includes less than about 5 weight percent impurities that can function as nucleation sites in the weld metal for carbide formation, typically less than about 1 weight percent impurities that can function as nucleation sites in the weld metal for carbide formation, more typically less than about 0.5 weight percent impurities that can function as nucleation sites in the weld metal for carbide formation, still more typically less than about 0.1 weight percent impurities that can function as nucleation sites in the weld metal for carbide formation, even more typically less than about 0.05 weight percent impurities that can function as nucleation sites in the weld metal for carbide formation, and yet even more typically less than about 0.01 weight percent impurities that can function as nucleation sites in the weld metal for carbide formation. In one embodiment of the invention, the titanium dioxide in the flux system includes at least about 25 percent purified titanium dioxide, typically the titanium dioxide in the flux system includes at least about 40 percent purified titanium dioxide, more typically the titanium dioxide in the flux system includes at least about 50 percent purified titanium dioxide, still more typically the titanium dioxide in the flux system includes at least about 70 percent purified titanium dioxide, and still even more typically the titanium dioxide in the flux system includes at least about 90 percent purified titanium dioxide. The flux system can include a combination of purified and natural titanium dioxide. One common source of natural titanium dioxide is rutile; however, it can be appreciated that other or additional natural sources of titanium dioxide can be used in the flux system. Purified titanium dioxide is defined in the present invention as titanium dioxide that is artificially manufactured and/or a natural source of titanium dioxide that has been purified. In one non-limiting embodiment of the invention, the sulfate process used to form titanium dioxide can include the use of ilmenite ore, containing titanium and iron, and sulfuric acid; however, it can be appreciated that other additional ores can be used. This process includes finely grinding and drying the ore. The ore may also be classified. The ground ore is then digesting the ground ore in concentrated sulfuric acid where the titanium in the ore changes into soluble titanyl sulfate. The drying and grinding of the ore help to ensure efficient sulfation of the ore during agitation with concentrated sulfuric acid. The formed solution is then purified and the iron is separated out as crystallized green iron, or ferrous sulfate. The iron can be separated by dissolving metal sulfates in water or weak acid, and then treating the solution to ensure that only ferrous-state iron is present. The solution temperature can be reduced to avoid premature hydrolysis and clarified by settling and chemical flocculation. The clear solution is then further cooled to crystallize coarse ferrous sulfate heptahydrate (known as "copperas", $FeSO_4$-$7H_2O$) which can then be separated from the process. During the precipitation step, the titanium oxide hydrate is precipitated and calcined in large rotating kilns at about 800-1200° C. to form crystalline titanium dioxide. Precipitation is typically carefully controlled to achieve the necessary particle size, usually employing a seeding or nucleating technique; however, this is not required. The calcined titanium dioxide typically undergoes one or more washing steps to remove impurities from the raw materials used to form the titanium dioxide. The formed titanium dioxide can then be finely ground and classified to obtain a particular particle size. In another non-limiting embodiment of the invention, the chloride process used to form titanium dioxide can include the use of natural and/or synthetic rutile; however, other or additional sources of titanium dioxide sources can be used. Typically, the feedstock for the chloride process includes at least about 80-90 weight percent titanium dioxide. The feedstock is generally mixed with a source of carbon and then reacted together in a fluidized bed with chlorine at about 800-1100° C. The reaction yields titanium tetrachloride, $TiCl_4$ and chlorides of other impurities in the feedstock. The formed chlorides are cooled and the low-volatile chloride impurities (e.g., iron chloride, manganese chloride, chromium chloride, etc.) are separated by condensation and removed from the gas stream with other un-reacted solid feedstock. The $TiCl_4$ gas is condensed to a liquid, and typically fractionally distilled to produce a pure, colorless, mobile liquid $TiCl_4$ intermediate product. The $TiCl_4$ intermediate product is then reacted with oxygen in an exothermic reaction to form titanium dioxide and to liberate the chlorine. The high temperature reaction ensures that $TiO_2$ crystal is essentially formed. The formed $TiO_2$ is then cooled and typically treated with a gas stream to remove chlorine from the $TiO_2$. The formed titanium dioxide can be then finely ground and classified to obtain a particular particle size. The purified titanium dioxide generally includes at least about 85 weight percent titanium dioxide, typically at least about 90 weight percent titanium dioxide, more typically at least about 93 weight percent titanium dioxide, even more typically at least about 95 weight percent titanium dioxide, still even more typically at least about 98.5 weight percent titanium dioxide, yet even more typically at least about 99 weight percent titanium dioxide, still yet even more typically at least about 99.5 weight percent titanium dioxide, and even more typically at least about 99.9 weight percent titanium dioxide. The average particle size of the purified titanium oxide is generally no greater than about 100 mesh, typically no greater than about 200 mesh, and more typically about 200-400 mesh; however, other particles sizes can be used.

In still another and/or alternative non-limiting aspect of the present invention, the moisture resistant compound includes one or more colloidal metal oxides. In addition to the moisture resisting properties of the one or more colloidal metal oxides, the one or more colloidal metal oxides can also have slag forming properties, binder properties, etc.; however, this is not required. When the one or more colloidal metal oxides are also used as a binder, the one or more colloidal metal oxides can form the complete binding function or be used in combination with one or more other binders such as, but not limited to, one or more silicate compounds (e.g., potassium silicate, sodium silicate, etc.). The moisture resistant compound content of the flux system is generally at least about 1 weight percent of the flux system, typically about 2-60 weight percent of the flux system, and more typically about 2-35 weight percent of the flux system; however, other weight percentages can be used. In one embodiment of the invention, the moisture resistant compound includes colloidal silica. In another and/or alternative embodiment of the invention, the one or more colloidal metal oxides form all or a portion of the moisture resistant compound. In another and/or alternative embodiment of the invention, the metal oxide which at least partially forms the colloidal metal oxide includes silicon dioxide. The silicon dioxide can be in a pure and/or impure form. Examples of impure forms include, but are not limited to, quartz, feldspar, mica, biotite, olivine, hornblende, muscovite, pyroxenes, and/or other sources of silicon dioxide. In one aspect of this embodiment, at least about 5% of the silicon dioxide in the colloidal metal oxide is a pure form of silicon dioxide. In another and/or alternative aspect of this embodiment, typically at least about 10% of the silicon dioxide in the colloidal metal oxide is pure silicon dioxide, more typically at least about 30% of the silicon dioxide in the colloidal metal oxide is pure silicon dioxide, even more typically at least about 50% of the silicon dioxide in the colloidal metal oxide is pure silicon dioxide, still more typically at least about 70% of the silicon dioxide in the colloidal metal oxide is pure silicon dioxide, and yet more typically at least about 90% of the silicon dioxide in the colloidal metal oxide is pure silicon dioxide.

In yet another and/or alternative non-limiting aspect of the present invention, the moisture resistant compound at least partially functions as a binder for the flux system. When the moisture resistant compound functions at least partially as a binder, the average particle size of the solid particles in the colloidal metal oxide is selected to be sufficiently small to achieve a binding effect of the colloidal particles. It has been found that when sufficiently small particles are used, a chemical binding effect, believed to be due to a Brownian effect, on the surface of the colloidal particles results in the binding together of one or more components of the flux system by the colloidal particles. In one aspect of this embodiment, the average particle size of the particles in the colloidal particles in the moisture resistant compound are less than about 800 nm, typically less than about 200 nm, more typically less than about 100 nm, still more typically less than about 70 nm, even more typically less than about 40 nm, still even more typically less than about 20 nm, yet even more typically less than about 10 nm, and still yet even more typically about 0.5-10 nm. In one non-limiting design, the average particle size of the colloidal particles are about 1-30 nm, typically about 2-25 nm, more typically about 5-15 nm, and even more typically about 5-10 nm. In one embodiment of the invention, moisture resistant compounds can comprise 100% of the binder of the flux system or constitute a fraction of the binder of the flux system. When the moisture resistant compound represents a fraction of the binder of the flux system, the moisture resistant compound can include and/or be mixed with other binders. Such other binders can include, but are not limited to, water glass (potassium silicate and/or sodium silicate), boric acid, borax, soluble carbonates, nitrates, oxillates or oxichlorides, various types of resins, sugar, starch, agar, and/or the like. In still another and/or alternative embodiment of the invention, the moisture resistant compound, when constituting a fraction of the total binder of the flux system, is generally combined with one or more silicates. When the colloidal particles in the moisture resistant compound are combined with one or more silicates, these components can constitute a majority of the binder of the flux system; however, this is not required. In one aspect of this embodiment, the colloidal particles in combination with one or more silicates constitutes at least about 60% of the binder of the flux system, even more typically constitutes at least about 70% of the binder of the flux system, and still even more typically constitutes at least about 90% of the binder of the flux system. In another and/or alternative embodiment, when the colloidal particles of the moisture resistant compound constitute a fraction of the total binder of the flux system, the colloidal particle generally constitutes at least about 5% of the total binder, typically at least about 10% of the total binder, more typically at least about 20% of the total binder, still more typically at least about 50% of the total binder, even more typically at least about 70% of the total binder, and yet even more typically at least about 90% of the total binder.

In still yet another and/or alternative aspect of the present invention, the moisture resistant compound is at least partially formed of a solution of colloidal metal oxides. The solution generally includes about 10-70 weight percent colloidal metal oxides and a liquid content of at least about 10 weight percent, and typically about 30-80 weight percent; however, other weight percentages for the metal oxides and/or liquid content can be used. The pH of the solution is typically basic; however, this is not required. Generally, the liquid component primarily includes water; however, additional and/or alternative liquids can be used. The liquid is used to suspend the colloidal particles so as to allow the colloidal particles to bind the components in the flux system. In one embodiment of the invention, the liquid component is substantially absent any hydrocarbon compounds. The introduction of hydrocarbon compounds in the liquid system can introduce hydrogen to weld metal during a welding process. In one aspect of this embodiment, the liquid contains less than about 10% hydrocarbon compounds, typically less than about 5% hydrocarbon compounds, more typically less than about 2% hydrocarbon compounds, and even more typically less than about 0.05% hydrocarbon compounds.

In a further and/or alternative non-limiting aspect of the present invention, the flux system is particularly directed for use in cored electrodes having a metal sheath that surrounds the flux system in the core of the sheath; however, the flux system can be applied to other types of electrodes (e.g., coating on stick electrodes, etc.), or be used as or part of a flux system in a submerged arc welding process. The flux system is particularly formulated for use with electrodes used to weld mild and low alloy steel; however, the flux system can be used with electrodes for the formation of welding beads on other types of metals. The metal electrode is typically formed primarily from iron (e.g., carbon steel, low carbon steel, stainless steel, low alloy steel, etc.); however, the base metal can be primarily formed of other materials. In one embodiment of the invention, the metal electrode includes a metal sheath that includes the flux system in the core of the metal electrode. The metal sheath generally includes a majority of iron when welding a ferrous based workpiece (e.g., carbon steel, stainless steel, etc.); however, the composition of the sheath can include various types of metals to achieve a particular weld bead composition. In one aspect of this embodiment, the metal sheath primarily includes iron and can include one or more other elements such as, but not limited to, aluminum, antimony, bismuth, boron, carbon, cobalt, copper, lead, manganese, molybdenum, nickel, niobium, silicon, sulfur, tin, titanium, tungsten, vanadium, zinc and/or zirconium. In still another and/or alternative aspect of this embodiment, the iron content of the metal sheath is at least about 80 weight percent. In still another and/or alternative embodiment of the invention, the flux system typically constitutes at least about 1 weight percent of the total electrode weight, and not more than about 80 weight percent of the total electrode weight, and typically about 8-60 weight percent of the total electrode weight, and more typically about 10-40 weight percent of the total electrode weight, even more typically about 11-30 weight percent of the total electrode weight, and still even more about 12-20 weight percent of the total electrode weight; however, other weight percentages can be used.

In still a further and/or alternative non-limiting aspect of the present invention, the flux system includes one or more slag forming agents, other than titanium dioxide. The slag forming agents are generally used to facilitate in the formation of the weld bead and/or to at least partially shield the formed weld bead from the atmosphere; however, the slag forming agents can have other or additional functions. Non-limiting examples of such slag forming agents include metal oxides (e.g., aluminum oxide, boron oxide, calcium oxide, chromium oxide, iron oxide, magnesium oxide, manganese oxide, niobium oxide, potassium oxide, sodium oxide, tin oxide, vanadium oxide, zirconium oxide, etc.), metal carbonates (e.g., calcium carbonate, etc.), and/or metal fluorides (e.g., barium fluoride, bismuth fluoride, calcium fluoride, potassium fluoride, sodium fluoride, Teflon, etc.). The slag forming agent content of the flux system is typically at least about 2 weight percent of the flux system, typically about 5-60 weight percent of the flux system, and more typically about 5-45 weight percent of the flux system; however, other weight percentages can be used.

In yet a further and/or alternative aspect of the present invention, the flux system includes one or more metal agents. The flux system can include metal alloying agents (e.g., aluminum, boron, calcium, carbon, cobalt, copper, chromium, iron, magnesium, manganese, molybdenum, nickel, selenium, silicon, tantalum, tin, titanium, zirconium, zinc, etc.) that are at least partially used to provide protection to the weld metal during and/or after a welding procedure, to facilitate in a particular welding procedure, and/or to modify the composition of the weld bead. In one embodiment of the invention, the flux system includes at least one of the weld metal protection agents. In another and/or alternative embodiment of the invention, the flux composition includes one or more metal alloying agents used to facilitate in forming a weld metal with the desired composition. In still another and/or alternative embodiment of the invention, the flux composition includes one or more metal slag modifying agents. The slag modifying agents are typically used to increase and/or decrease the viscosity of the slag, to improve the ease of slag removal from the weld metal, reduce fume production, reduce spattering, etc. The metal agents, when included in the flux system, generally constitute at least about 1 weight percent of the flux system, typically about 5-85 weight percent of the flux system, more typically about 10-60 weight percent of the flux system; however, other weight percentages can be used.

In still yet a further and/or alternative aspect of the present invention, a shielding gas is used in conjunction with the electrode to provide protection to the weld bead from elements and/or compounds in the atmosphere. The shielding gas generally includes one or more gases. These one or more gases are generally inert or substantially inert with respect to the composition of the weld bead. In one embodiment, argon, carbon dioxide or mixtures thereof are at least partially used as a shielding gas. In one aspect of this embodiment, the shielding gas includes about 2-40 percent by volume carbon dioxide and the balance of argon. In another and/or alternative aspect of this embodiment, the shielding gas includes about 5-25 percent by volume carbon dioxide and the balance of argon. As can be appreciated, other and/or additional inert or substantially inert gases can be used.

In another and/or alternative aspect of the present invention, the flux system of the present invention is dried and then ground to a certain particle size. The ground particles can be screened or otherwise classified to obtain a desired particle size profile. Generally, the flux system is ground and then screened to obtain an average particle size of the flux system of less than about 48 mesh, typically about 80-400 mesh, and more typically about 100-200; however, other particle sizes can be selected. When the flux system is used in a submerged arc welding process, the ground flux system is typically poured into a groove of a workpiece and then subjected to an electric arc as a metal rod is melted to form the weld metal. When a flux cored electrode is being formed, a certain amount of ground flux is deposited onto the electrode prior to the electrode being shaped into a cored electrode, wherein the flux system fills the cored region of the electrode.

It is an object of the invention to provide a flux system that reduces the amount of impurities that reside in the weld metal.

Another and/or alternative object of the present invention is the provision of a flux system that reduces incidences of cracking in the weld metal.

Still another and/or alternative object of the present invention is the provision of a flux system that reduces the amount of carbide formation in the weld metal.

Yet another and/or alternative object of the present invention is the provision of a flux system that reduces the diffusible hydrogen content in the weld metal.

Still yet another and/or alternative object of the present invention is the provision of a flux system that has reduced moisture pick-up properties.

A further and/or alternative object of the present invention is the provision of a flux system that includes titanium dioxide and colloidal metal oxide.

Yet a further and/or alternative object of the present invention is the provision of a flux system which can be used in a submerged arc welding process, can be coated onto an electrode, and/or can be used in the core of a flux cored electrode.

Still a further and/or alternative object of the present invention is the provision of a flux system which includes a binder that chemically binds together one or more components of the flux system.

Yet a further and/or alternative object of the present invention is the provision of a flux system that is used in conjunction with a shielding gas.

Still yet a further and/or alternative object of the present invention is the provision of a flux system that is used with a self shielding electrode.

These and other objects and advantages will become apparent from the discussion of the distinction between the invention and the prior art and when considering the preferred embodiment as shown in the accompanying drawings.

BRIEF DESCRIPTION OF THE INVENTION

Figure 1:
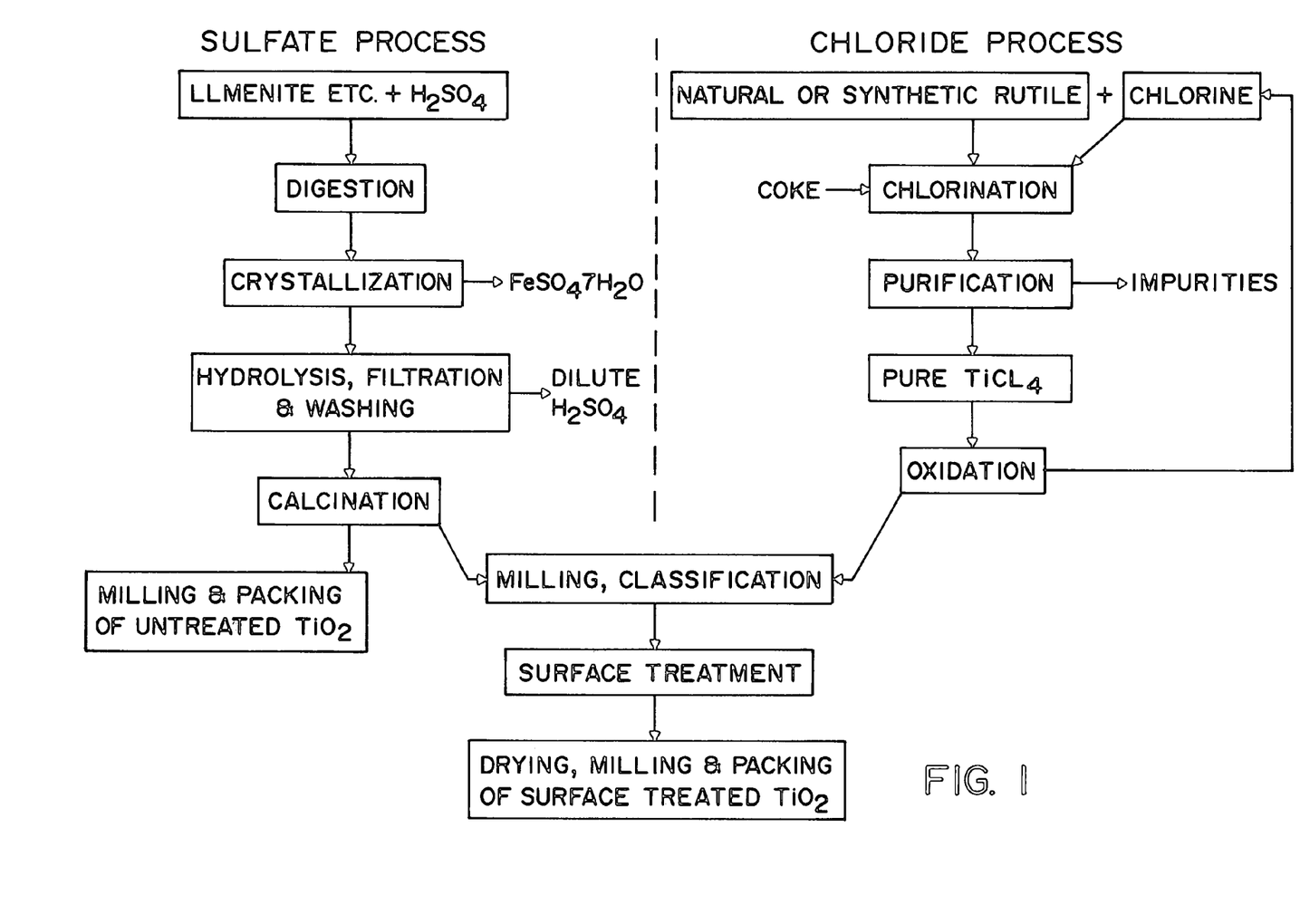
FIG. 1 is an illustration of two different titanium oxide purification processes that can be used to form purified titanium dioxide for use in the flux system of the present invention; and, FIG. 2 is an illustration of one non-limiting process that can be used to form the flux system of the present invention.

Referring now in greater detail to the drawings, wherein the showings are for the purpose of illustrating preferred embodiments of the invention only, and not for the purpose of limiting the invention, FIG. 1 illustrates two processes (e.g., sulfate process and chloride process) that can be used to produce purified titanium oxide for use in the flux system of the present invention. The sulfate process typically includes the use of ilmenite as a feedstock. The ilmenite is mixed with hydrogen sulfate, and ferrous sulfate heptahydrate is then removed. The remaining mixture is washed and then calcined. The titanium dioxide can then be ground and sized. The formation of titanium dioxide by a sulfate process is known in the art and will not be further described. The chloride process typically includes rutile as a feed stock. The rutile is mixed with a carbon source and reacted in a fluidized bed with chlorine to form titanium tetrachloride. The titanium tetrachloride is then oxidized to form titanium dioxide. The titanium dioxide can then be ground and sized. The formation of titanium dioxide by a chloride process is known in the art and will not be further described.

The purified titanium dioxide is used in a titanium dioxide based flux system to overcome the past limitations of prior art flux systems regarding the introduction of impurities into the weld metal during a welding process. The purified titanium dioxide has very little or no metal impurities that can act as nucleation sites in the weld metal for carbide formation. Impurities such as niobium and vanadium are eliminated from or significantly reduced in the purified titanium dioxide. Typically the purified titanium dioxide includes less than about 0.1 weight percent impurities that can function as nucleation sites in the weld metal for carbide formation.

The purified titanium dioxide generally is a fluffy compound having a relatively low bulk density. As such, the purified titanium dioxide may not produce enough bulk in the flux system, especially when used in the core of an electrode. As such, the purified titanium dioxide is typically agglomerated with one or more other components of the flux system; however, this is not required. When the purified titanium dioxide is at least partially agglomerated, the purified titanium dioxide is typically mixed with one or more binders (e.g., colloidal metal oxide, water glass, etc.).

The titanium based flux system typically includes colloidal silica as a moisture resistant compound to reduce the moisture pick-up properties of the titanium based flux system; however, this is not required. Moisture in the flux system can provide a source of hydrogen about the welding metal which can result in increased levels of diffusible hydrogen in the weld metal. The moisture resistant compound in the titanium based flux system reduces the amount of water in the flux system thereby facilitating in the reduction of diffusible hydrogen in the weld metal.

The colloidal silica can also function as a binder for one or more components of the flux system such as, but not limited to, the purified titanium dioxide. In addition to titanium dioxide and colloidal silica, the flux system can include one or more metal oxides (e.g., aluminum oxide, boron oxide, calcium oxide, chromium oxide, iron oxide, magnesium oxide, niobium oxide, potassium oxide, sodium oxide, tin oxide, vanadium oxide, zirconium oxide, etc.), metal carbonates (e.g., calcium carbonate, etc.), metal fluorides (e.g., barium fluoride, bismuth fluoride, calcium fluoride, potassium fluoride, sodium fluoride, Teflon, etc.), and/or metal alloying agents (e.g, aluminum, boron, calcium, carbon, iron, manganese, nickel, silicon, titanium, zirconium, etc.). The particular components of the flux system typically depend on the type of welding process (SAW, SMAW, FCAW) to be used and/or the type of workpiece to be welded.

Figure 2:
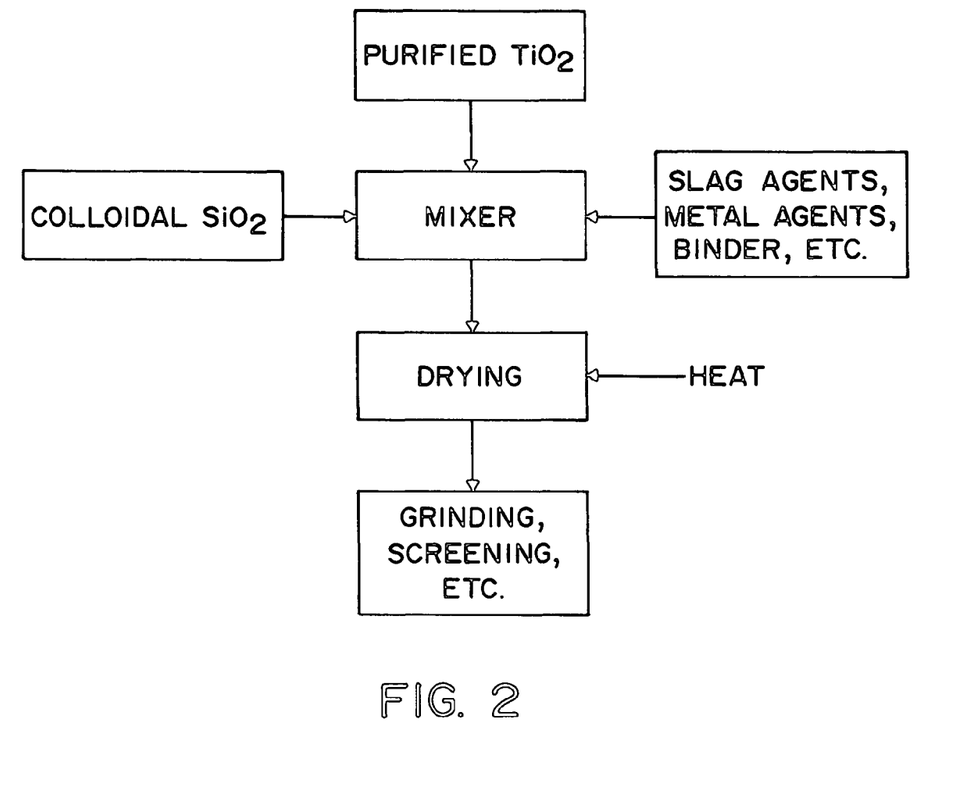

Referring now to FIG. 2, a process of forming part of or a complete flux system for use in submerged arc welding or for filling the core of a flux cored electrode is illustrated. Purified titanium oxide is combined with a solution of colloidal silica in a mixer. As can be appreciated, other components of the flux system can also be added. The average particle size of the purified titanium oxide is typically about 200-400 mesh and the average particle size of the colloidal silica is typically about 2-50 nm; however, other particle sizes can be used. When other flux components are added, these other flux components typically have an average particle size of about 40-400 mesh. The flux components can be mixed in a variety of mixers such as, but not limited to, an Eirich mixer. The flux components and/or metal alloying agents are then mixed by the mixer to form a wet mix. As can be appreciated, the flux components can be first mixed with the colloidal silica and then with the metal alloying agents, or the metal alloying agents can be first mixed with the colloidal silica and then the flux components, or any other mixing order. Typically, over 80 weight percent of the small particles in the colloidal particles in the flux system are silicon dioxide particles. The liquid component of colloidal solution typically constitutes about 60-85 weight percent of the colloidal solution, and more typically about 70 weight percent of the colloidal solution. The liquid is typically water; however, other and/or additional liquids can be used. The colloidal particles in the colloidal solution can function as the binder for the flux system, or one or more binders can be included in the flux system. When the colloidal particles are used with one or more other binders, the other binders typically include water glass; however, this is not required. When the binder of the flux system is formed principally of water glass and colloidal particles, the colloidal particles typically form about 5-75 weight percent of the binder and more typically about 20-50 weight percent of the binder.

After the flux components have been properly mixed together, the flux components are dried to reduce the moisture content of the flux system. The flux can be dried in a variety of dryers such as, but not limited to, a continuous or batch rotary kiln. The drying temperate typically is about 200-1800° F.; however, other temperatures can be used. The flux system is dried until the moisture content of the flux system is less than about 6 weight percent, more typically less than about 3 weight percent, yet more typically less than about 1 weight percent, still more typically less than about 0.5 weight percent, and even more typically less than about 0.2 weight percent. The moisture content of the flux system after the drying process will typically depend on the type of arc welding process being used. Flux systems used in high-strength steel welding processes wherein the hydrogen content is desired to be at extremely low levels, the moisture content of the flux system is typically less than about 1%, more typically less than about 0.4%, even more typically less than about 0.2%, and still even more typically less than about 0.15%. After the flux system has been dried, the flux system is ground and screened or otherwise classified to obtain the desired particle size of the flux system. Typically the flux system has an average particle size of about 40-200 mesh. The flux system formed by this process can be the complete flux system used during a welding process, or form a portion of the complete flux system, When only forming a portion of the complete flux system, the flux system formed by the process above is combined with one or more other flux agents and/or metal agents to form the complete flux system. Typically, the flux system formed by the above process constitutes at least about 15 weight percent of the complete flux system, and more typically at least about 30 weight percent of the complete flux system, and still more typically at least a majority of the complete flux system.

A general formulation of the flux system (weight percent) in accordance with the present invention is set forth as follows:

| | |
|---|---|
| $TiO_2$ (At least 5% Purified) | 2-70% |
| Colloidal metal oxide | 1-40% |
| Slag forming Agent | 1-60% |
| Metal Alloying Agent | 0-80% |

In another general formulation of the flux system (weight percent):

| | |
|---|---|
| $TiO_2$ (At least 20% Purified) | 3-60% |
| Colloidal metal oxide | 1-30% |
| Slag forming Agent | 0-50% |
| Metal Alloying Agent | 0-70% |

In still another general formulation of the flux system (weight percent):

| | |
|---|---|
| $TiO_2$ (At least 50% Purified) | 5-40% |
| Colloidal metal oxide | 1-25% |
| Slag forming Agent | 5-45% |
| Metal Alloying Agent | 0-50% |

In yet another general formulation of the flux system (weight percent):

| | |
|---|---|
| $TiO_2$ (At least 90% Purified) | 10-40% |
| Colloidal silica | 1-20% |
| Slag forming Agent | 10-40% |
| Metal Alloying Agent | 0-40% |

In the above examples, the flux system can be used in a coded electrode. The weight percent of the flux system in the cored electrode is typically about 8-60 weight percent of the cored electrode, and more typically about 10-28 weight percent of the cored electrode; however, other weight percentages can be used. The metal sheath that can be used to form the weld bead can include about 0-0.2 weight percent B, about 0-0.2 weight percent C, about 0-12 weight percent Cr, about 0-5 weight percent Mn, about 0-2 weight percent Mo, less than about 0.01% N, about 0-5 weight percent Ni, less than about 0.014% P, about 0-4 weight percent Si, less than about 0.02% S, about 0-0.4 weight percent Ti, about 0-0.4 weight percent V and about 75-99.9 weight percent Fe. During an arc welding process, a shielding gas can be used with the cored electrode; however, this is not required. When a shielding gas is used, the shielding can is typically a carbon dioxide and argon blend.

The slag forming agent typically includes, but is not limited to, metal oxides such as aluminum oxide, boron oxide, calcium oxide, chromium oxide, iron oxide, magnesium oxide, niobium oxide, potassium oxide, sodium oxide, tin oxide, vanadium oxide and/or zirconium oxide. The metal alloying agent, when used, typically includes, but is not limited to, aluminum, boron, calcium, carbon, iron, manganese, nickel, silicon, titanium and/or zirconium. The flux system can include other compounds such as, but not limited to, metal carbonates (e.g., calcium carbonate, etc.) and/or metal fluorides (e.g., barium fluoride, bismuth fluoride, calcium fluoride, potassium fluoride, sodium fluoride, Teflon, etc.). The particular components of the flux system typically depend on the type of welding process (SAW, SMAW, FCAW) to be used and/or the type of workpiece to be welded.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

I claim:

1. A flux cored electrode including a flux system, said flux system comprising titanium dioxide and a moisture resistant compound, said titanium oxide including purified titanium dioxide, said moisture resistant compound including a colloidal metal oxide, said colloidal metal oxide having an average particle size of less than about 800 nm, said purified titanium dioxide including less than about 5 weight percent impurities that can act as nucleation sites for carbide formation in a weld metal, wherein said flux system is located within the core of the electrode.

2. The flux cored electrode as defined in claim 1, wherein said titanium dioxide constitutes about 5-90 weight percent of said flux system.

3. The flux cored electrode as defined in claim 1, wherein at least about 5 weight percent of said titanium dioxide is purified titanium dioxide.

4. The flux cored electrode as defined in claim 2, wherein at least about 5 weight percent of said titanium dioxide is purified titanium dioxide.

5. The flux cored electrode as defined in claim 1, wherein said colloidal metal oxide includes silica.

6. The flux cored electrode as defined in claim 4, wherein said colloidal metal oxide includes silica.

7. The flux cored electrode as defined in claim 1, wherein said moisture resistant compound constitutes about 1-60 weight percent of said flux system.

8. The flux cored electrode as defined in claim 4, wherein said moisture resistant compound constitutes about 1-60 weight percent of said flux system.

9. The flux cored electrode as defined in claim 1, including metal agent, said metal agent constituting about 1-85 weight percent of said flux system.

10. The flux cored electrode as defined in claim 6, including metal agent, said metal agent constituting about 1-85 weight percent of said flux system.

11. The flux cored electrode as defined in claim 1, wherein said average flux particle size is about 40-300 mesh.

12. The flux cored electrode as defined in claim 8, wherein said average flux particle size is about 40-300 mesh.

13. The flux cored electrode as defined in claim 1, wherein said moisture content of said flux system is less than about 1%.

14. The flux cored electrode as defined in claim 10, wherein said moisture content of said flux system is less than about 1%.

15. The flux cored electrode as defined in claim 1, including a binder, said binder including a mixture of said colloidal metal oxide and metal silicate, said mixture constituting a majority of weight percent of said binder, said metal silicate including potassium silicate, sodium silicate, or mixtures thereof.

16. The flux cored electrode as defined in claim 12, including a binder, said binder including a mixture of said colloidal metal oxide and metal silicate, said mixture constituting a majority weight percent of said binder, said metal silicate including potassium silicate, sodium silicate, or mixtures thereof.

17. The flux cored electrode as defined in claim 1, wherein said flux system comprises by weight percent of the flux system:

| | |
|---|---|
| $TiO_2$ (At least 90% Purified) | 10-40% |
| Colloidal silica | 1-20% |
| Slag forming Agent | 10-40% |
| Metal Alloying Agent | 0-40%. |

18. The flux cored electrode as defined in claim 14, wherein said flux system comprises by weight percent of the flux system:

| | |
|---|---|
| $TiO_2$ (At least 90% Purified) | 10-40% |
| Colloidal silica | 1-20% |
| Slag forming Agent | 10-40% |
| Metal Alloying Agent | 0-40%. |

* * * * *